United States Patent
Nory et al.

(10) Patent No.: US 9,197,387 B2
(45) Date of Patent: Nov. 24, 2015

(54) METHOD AND APPARATUS FOR CONTROL CHANNEL TRANSMISSION AND RECEPTION

(75) Inventors: Ravikiran Nory, Buffalo Grove, IL (US); Sandeep H. Krishnamurthy, Mountain View, CA (US); Robert T. Love, Barrington, IL (US); Vijay Nangia, Algonquin, IL (US); Ajit Nimbalker, Buffalo Grove, IL (US); Krishna Kamal Sayana, Arlington Heights, IL (US); Xiangyang Zhuang, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 631 days.

(21) Appl. No.: 13/569,606

(22) Filed: Aug. 8, 2012

(65) Prior Publication Data
US 2013/0044727 A1 Feb. 21, 2013

Related U.S. Application Data

(60) Provisional application No. 61/523,586, filed on Aug. 15, 2011.

(51) Int. Cl.
*H04L 5/00* (2006.01)
(52) U.S. Cl.
CPC ............ *H04L 5/0053* (2013.01); *H04L 5/0051* (2013.01); *H04L 5/0092* (2013.01); *H04L 5/0023* (2013.01)
(58) Field of Classification Search
CPC .................................................. H04L 5/0051
See application file for complete search history.

(56) References Cited

U.S. PATENT DOCUMENTS

2010/0331030 A1  12/2010  Nory et al.
2011/0019776 A1   1/2011  Zhang et al.
(Continued)

FOREIGN PATENT DOCUMENTS

WO      2008157692 A2     12/2008
WO   WO 2010087177 A1  *   8/2010
WO      2011140384 A2     11/2011

OTHER PUBLICATIONS

LG Electronics: "Discussions on DL Control Signaling Enhanement", 3GPP TSG RAN WG1 Meeting #65, Barcelona, Spain, May 9-13, 2011, R1-111789, all pages.
(Continued)

*Primary Examiner* — Robert M Morlan
(74) *Attorney, Agent, or Firm* — Lerner, David, Littenberg, Krumholz & Mentlik, LLP

(57) ABSTRACT

A user equipment (UE) receives a signal comprising multiple resource blocks and configured for receiving a subframe comprising multiple time-frequency resources, the time-frequency resources comprising at least two control channel candidates. The UE determines a first control channel candidate of the at least two control channel candidates in the subframe, determines a first antenna port (AP) associated with the first control channel candidate, decodes the first control channel candidate based on the first AP, determines a second control channel candidate of the at least two control channel candidates in the subframe, determines a second AP associated with the second control channel candidate, and decodes the second control channel candidate based on the second AP, wherein the AP used for decoding the first control channel candidate is distinct from the AP used for decoding the second control channel candidate.

20 Claims, 11 Drawing Sheets

(56) References Cited

U.S. PATENT DOCUMENTS

| | | | |
|---|---|---|---|
| 2011/0024633 A1 | 2/2011 | Aoyagi et al. | |
| 2011/0038275 A1 | 2/2011 | Kim et al. | |
| 2011/0064159 A1 | 3/2011 | Ko et al. | |
| 2011/0194536 A1* | 8/2011 | Kim et al. | 370/335 |
| 2011/0243090 A1* | 10/2011 | Grovlen et al. | 370/329 |
| 2011/0249633 A1 | 10/2011 | Hong et al. | |
| 2011/0274031 A1* | 11/2011 | Gaal et al. | 370/315 |
| 2011/0286413 A1* | 11/2011 | Nishio et al. | 370/329 |
| 2012/0033643 A1 | 2/2012 | Noh et al. | |
| 2012/0058791 A1* | 3/2012 | Bhattad et al. | 455/509 |
| 2012/0252447 A1* | 10/2012 | Sartori et al. | 455/434 |
| 2013/0039284 A1* | 2/2013 | Marinier et al. | 370/329 |
| 2013/0058285 A1* | 3/2013 | Koivisto et al. | 370/329 |

OTHER PUBLICATIONS

NTT DOCOMO: "DL Control Channel Enhancement for DL MIMO in Rel-11", 3GPP TSG RAN WG1 Meeting #65, Barcelona, Spain, May 9-13, 2011, R1-111636, all pages.
3rd Generation Partnership Project; Technical Specification Group Radio Access Network; Evolve Universal Terrestrial Radio Access (E-UTRA); Physical layer for relaying operation (Release 10), 3GPP TS 36.216 v10.2.0 (Mar. 2011), all pages.
Huawei, Hisilicon: "Invengation on downlink control channel and signaling enhancements", 3GPP TSG RAN WG1 Meeting #65, Barcelona, Spain, May 9-13, 2011, R1-111253, all pages.
Nokia, Nokia Siemens Networks: "On enhanced downlink control signalling for Rel-11", 3GPP TSG RAN WG1 Meeting #65, Barcelona, Spain, May 9-13, 2011, R1-111743, all pages.
Nokia et al: "On enhanced downlinkcontrol signalling for Re1-11", 3GPP Draft; RI-111743, 3rd Generation Partnership Project (3GPP), Mobile Competence Centre ., 650, Route Des Lucioles ., F-06921 Sophia-Antipolis Cedex , France, vol. RAN WG1, No. Barcelona, Spain; May 9, 2011, May 3, 2011.
Huawei et al: IIR-PDCCH Search Space Size, 3GPP Draft; RI-105850, 3rd Generation Partnership Project (3GPP), Mobile Competence Centre ; 650, Route Des Lucioles ; F-06921 Sophiaantipolis Cedex; France, vol. RAN WG1, No. Jacksonville, USA; 20101115, Nov. 9, 2010.
LG Electronics: "Fallback Operation for a UE configured with ePDCCH" , 3GPP Draft; RI-122311 Fallback Operation in EPDCCH LG, 3rd Generation Partnership Project (3GPP), Mobile Competence Centre; 650, Route Des Lucioles ; F-06921 Sophia-Antipolis Cedex ; France, vol. Ran WG1, No. Prague, Czech Republic; 20128521-20120512, May 12, 2012.
Panasonic: "Considerations on PDCCH Enhancements for Release 11", 3GPP Draft; RI-111589 PDCCH Enhancement, 3rd Generation Partnership Project (3GPP), Mobile Competence Centre; 658, Route Des Lucioles ; F-06921 Sophia-Antipolis Cedex; France, vol. RAN WG1, No. Barcelona, Spain; May 9, 2011, May 3, 2011.
Qualcomm Incorporated: "R-PDCCH search space", 3GPP Draft; RI-184814 R-PDCCH Search Space, 3rd Generation Partnership Project (3GPP), Mobile Competence Centre; 650, Route Des Lucioles ; F-06921 Sophia-Antipolis Cedex ; France, vol. Ran WG1, No. Madrid, Spain; Aug. 23, 2010, Aug. 17, 2010.
Motorola: "Temporary C-RNTI, C-RNTI use with Common and UE Specific Search Spaces", 3GPP Draft; RI-084583(RI-084419)-Draft CR 36 213 TC-RNTI, C-RNTI Use With CCSS and DESS, 3rd Generation Partnership Project (3GPP), Mobile Competence Centre; 650, Route Des Lucioles ; F-06921 Sophia-Antipolis Cedex ; France, vol. RAN WG1, No. Prague, Czech Republic; Nov. 15, 2000, Nov. 7, 2000.
China Unicom: "Consideration on Multiplexing of Localized and Distributed ePDCCH", 3GPP Draft; RI-122388 Consideration on Multiplexing of Localised and Distributed EPDCCH, 3rd Generation Partnership Project (3GPP), Mobile Competence Centre; 650, Route Des Lucioles ; F-06921 Sophia-Antipolis Cedex ; France, vol. RAN WG1, No. Prague, Czech Republic; May 21, 2012-May 25, 2012, May 12, 2012.
Patent Cooperation Treaty, International Search Report and Written Opinion of the International Searching Authority for International Application No. PCT/US2012/050700, Mar. 11, 2013, 22 pages.
Motorola: "Search Space Definition for LI/L2 Control Channels". 3GPP Draft; R1-073373—PDCCH Candidate Search Space. 3rd Generation Partnership Project (3GPP). Mobile Competence Centre, 650. Route Des Lucioles •, F-06921 Sophia-Antipolis Cedex •, France vol. RAN WG1. No., Athens Greece; Aug. 20, 2007-Aug. 24, 2007. Aug. 15, 2007. XP050596460. [retrieved on Aug. 15, 2007], all pages.
QUALCOMM Incorporated: "Remaining details of R-PDCCH search space", 3GPP Draft; R1-106377 Remaining Details of R-PDCCH Search Space, 3rd Generation Partnership Project (3GPP), Mobile Competence Centre ; 650, Route Des Lucioles ; F-06921 Sophia-Antipolis Cedex; France, vol. RAN WG1, No. Jacksonville, USA; Nov. 15, 2011-Nov. 19, 2010, Nov. 9, 2010, XP050598885, all pages.
LG Electronics: "Resource Allocation and Downlink Control Channel Structure for Relay Backhaul Link", 3GPP Draft; R1-094189 RPDCCH LGE, 3rd Generation Partnership Project (3GPP), Mobile Competence Centre; 650, Route Des Lucioles ; F-06921 Sophia-Antipolis Cedex; France, No. Miyazaki; 20091012, Oct. 12, 2009, XP050388659, all pages.
Patent Cooperation Treaty, International Search Report and Written Opinion of the International Searching Authority for International Application No. PCT/US2012/050694, Nov. 15, 2012, 14 pages.

* cited by examiner

-PRIOR ART- FIG. 1

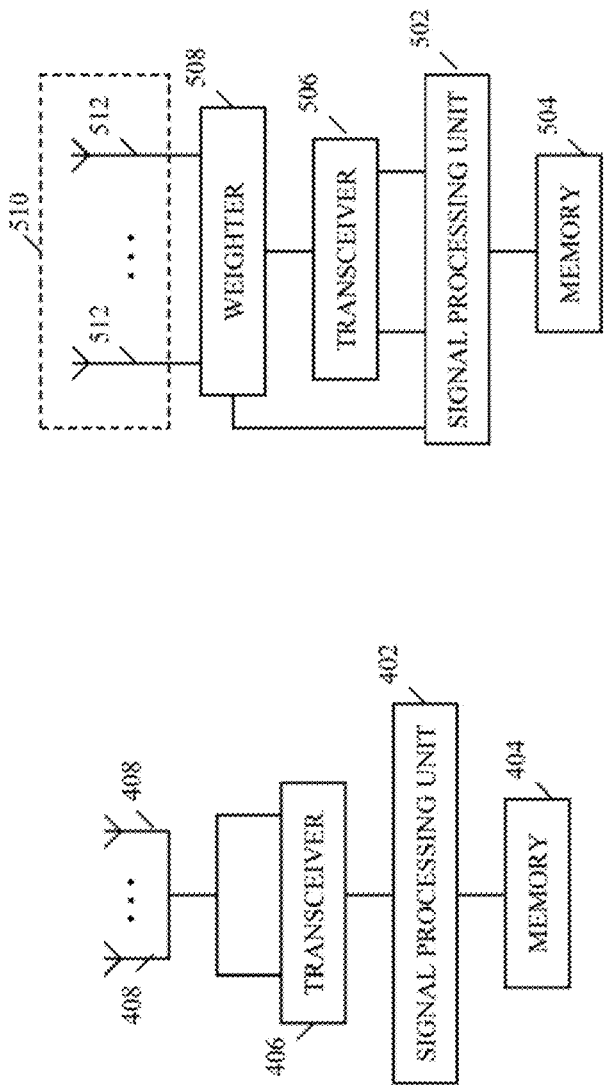

FIG. 7

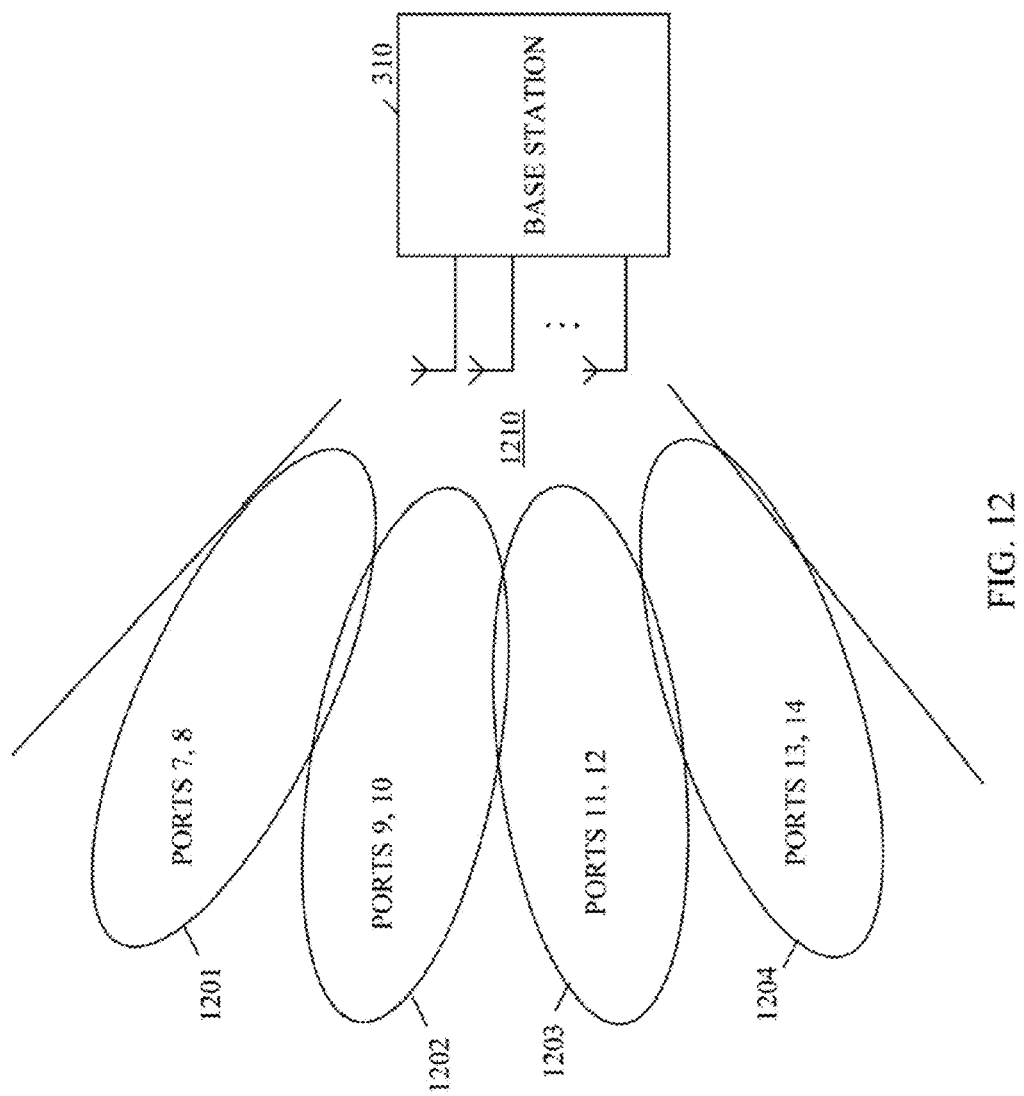

METHOD AND APPARATUS FOR CONTROL CHANNEL TRANSMISSION AND RECEPTION

RELATED APPLICATIONS

This application claims priority to U.S. Patent Application No. 61/523,586 filed Aug. 15, 2011.

CROSS-REFERENCE TO RELATED APPLICATIONS

This application is related to U.S. patent application Ser. No. 13/569,646, entitled "METHOD AND APPARATUS FOR CONTROL CHANNEL TRANSMISSION AND RECEPTION," and filed on the same date as this application.

FIELD OF THE INVENTION

The present disclosure relates generally to wireless communication systems, and more particularly to control channel transmission and reception in an Orthogonal Frequency Division Multiplexing (OFDM) communication system.

BACKGROUND OF THE INVENTION

In current 3GPP LTE (Third Generation Partnership Project Long Term Evolution) communication systems, that is, Releases 8, 9, and 10, downlink (DL) control signaling from an eNodeB is received by a user equipment (UE) in the first three (or four) symbols of a subframe (typically less than 3 for large system bandwidths such as 5 MHz, etc and less than 4 for smaller system bandwidths such as 1.25 MHz). The control channel duration is signaled on the Physical Control Format Indicator Channel (PCFICH) or sent via higher layer signaling. The remaining symbols are typically used for receiving user data, system information, synchronization signals, etc. For example, FIG. 1 depicts an exemplary subframe structure of the prior art. Control signaling is spread across an entire carrier bandwidth (for example, 10 Megahertz (MHz)) of the first three symbols of the subframe and is received by the UE on a Physical Downlink Control Channel (PDCCH). User data is received by the UE on the Physical Downlink Shared Channel (PDSCH), and in select Resource Blocks (RBs) of the PDSCH occupying either in the entire carrier bandwidth or a portion of it. In the Rel-8 LTE and beyond LTE systems such as Rel-10 (also known as LTE-Advanced), the base station transmits using an OFDM modulation scheme on the downlink and the UEs transmit on the uplink using a single carrier frequency division multiple access (SC-FDMA) scheme and/or Discrete Fourier Transform Spread OFDM (DFT-SOFDM). In a Frequency Division Duplex (FDD) operation, the frame structure in the uplink and downlink, each comprises a 10 millisecond (ms) Radio frame, which in turn is divided into ten subframes, each of 1 ms duration, wherein each subframe is divided into two slots of 0.5 ms each, wherein each slot contains a number of OFDM symbols. In Time-Division Duplex (TDD), the Radio Frame is still divided into 10 subframes, but the subframes can be of different types—downlink subframes, uplink subframes, and special subframes that have a downlink sub-portion (or region, DwPTS), guard sub-portion (or period or GP) and an uplink sub-portion (UpPTS). The DL subframes are typically of two types—regular DL subframes that contain CRS in both slots and Multicast-Broadcast Single-Frequency Network (MBSFN) subframes that contain CRS only in the beginning portion of the subframe while the rest of the subframe contains no CRS. The UEs receive downlink control information (DCI) in the control region. There are various DCI Format types for carrying a variety of control information. For example, the DCI Format 0 is used to schedule uplink transmissions and typically comprises scheduling information fields such as a modulation and coding scheme (MCS) index, Resource block allocation, Hopping flag, New Data Indicator, Transmit power control (TPC) command, and/or hybrid ARQ information. The user identification or user ID (UEID) is typically embedded within the CRC bits (e.g. the CRC is scrambled based on UEID). The DCI Format 1A is a compact scheduling grant used to schedule a single transport block and includes fields similar to those in DCI Format 0, and additional fields such as Redundancy Version (RV). DCI Format 2A is used to schedule two transport blocks in the downlink using open-loop MIMO whereas DCI Format 2B is used to schedule two transport blocks in the DL using closed-loop MIMO and CRS. DCI Format 2C is used for scheduling DL transmissions in transmission mode 9, where the up to two transport blocks may be scheduled using DMRS.

In order to decode the information sent on PDCCH, the UE needs to perform channel estimation for coherent demodulation of the PDCCH. To perform channel estimation, the UE receives Reference Signals (RSs), for example, pilot symbols, that are Cell-specific reference signals (CRS) and included in the subframe and that are associated with one or more antenna ports. For example, in 3GPP LTE Releases 8, 9, and 10, the UE uses the CRSs associated with one or more of antenna ports 0, 1, 2, and 3 for receiving the PDCCH. The number of antenna ports used for demodulating control channels is determined from decoding of the Physical Broadcast Channel (PBCH) that is transmitted in known Resource blocks in subframe 0. Typically, transmit diversity scheme is used when more than one antenna port is used for control channel demodulation. An antenna port is defined such that a channel over which a symbol on the antenna port is conveyed can be inferred from the channel over which another symbol on the same antenna port is conveyed. The Reference Signals (RS) structure for antenna ports 0, 1, 2, and 3 is shown in FIG. 1, wherein RSs labeled R0 are resource elements carrying RSs associated with antenna port 0, RSs labeled R1 are resource elements carrying RSs associated with antenna port 1, RSs labeled R2 are resource elements carrying RSs associated with antenna port 2, and RSs labeled R3 are resource elements carrying RSs associated with antenna port 3.

For 3GPP LTE Release 10, in order to demodulate user data (sent on PDSCH), the UE can either use the RSs associated with antenna ports 0, 1, 2, and 3 or the UE can use RSs associated with other antenna ports, such as antenna ports 7, 8, 9, 10, 11, 12, 13, and 14, that is, the UE can use RSs associated with all or a subset of these antenna ports, based on the transmission scheme used for PDSCH reception. The RSs associated with these other antenna ports are typically referred to as "UE specific reference signals (UERSs)" or "Demodulation reference signals (DMRSs) or "Dedicated reference signals (DRS)." The RSs associated with antenna ports 0, 1, 2, and 3 are typically referred to as "Common Reference Signals (CRSs)." In transmission schemes based on CRS, the UE may use one or more of antenna ports 0,1,2,3 and for transmission schemes based on DMRS, the UE may use one or more of antenna ports 7,8,9,10,11,12,13,14. The actual number of spatial transmission layers and the associated antenna ports when using DMRS to decode PDSCH may be determined by the UE based on the downlink control channel (DCI) information associated with PDSCH. Typically, both CRS and DMRS are not simultaneously used to demodulate data in PDSCH. While the CRSs are sent across the entire carrier bandwidth by the eNodB, DMRSs can only be present in those RBs for which the UE has a PDSCH assignment. Therefore, when receiving PDSCH using DMRS, the UE can only use the DMRS present on those RBs for which it has a PDSCH assignment.

For 3GPP LTE Release 11 (the next generation LTE system), it is envisioned that new DL control signaling will be sent by the eNodeB to the UE in symbols that span a first time slot of the subframe or in symbols that span both the first and a second time slot of the subframe. The new DL control signaling is generally referred to as Enhanced-PDCCH (EP-DCCH). Unlike the PDCCH, which is transmitted across the entire channel bandwidth, a UE is expected to receive the EPDCCH in a set of RBs that may span only a portion of the carrier bandwidth in frequency domain. Also, unlike the PDCCH, which is received by the UE using CRS, it is envisioned that the EPDCCH can be received by the UE using DMRS.

The new DL control signaling, that is, the EPDCCH, is expected to be used to complement the downlink control channels, that is, the PDCCH, of the existing 3GPP LTE Releases 8/9/10 for supporting features of Long Term Evolution-Advanced (LTE-A) Release 11+, such as CoMP (Coordinated Multi-point Transmissions) and enhanced Multiple-Input Multiple-Output (MIMO) techniques, including Multi-User MIMO (MU-MIMO). Such control channel enhancements may allow beamformed frequency-selective control transmission, for example, using dedicated control transmission to a UE via use of DMRSs and allocation of spatially multiplexed control channels to a single user MIMO (SU-MIMO) and/or to MU-MIMO control channels. Typically, such new control channels may be defined as Frequency Division Multiplexed (FDM) control channels that occupy fewer downlink (DL) RBs compared to the total number of DL RBs. Another new DL control channel, that is, a Relay Physical Downlink Control Channel (R-PDCCH), carries downlink control information (DCI) for Relay Nodes (RNs). The R-PDCCH has a mode of operation (no cross-interleaving, DMRS-based) wherein the DCI conveyed to an RN occupies a small number of RBs (typically 1, 2, 4, or 8 RBs) and the set of RBs configured for control channel transmission is signaled via the Radio Resource Control (RRC) protocol. Additionally, the RN assumes a fixed antenna port, that is, antenna port 7 (AP7), and a fixed scrambling identifier (ID), that is, scrambling ID 0, for receiving the DCI (that is, there is no MU-MIMO). DL grants are sent in a first time slot and uplink (UL) grants are sent in a second time slot.

Given a fixed or limited blind decoding budget per user, such as a UE or an RN, there is a need to develop an efficient control channel design that also addresses control channel blocking problem in a multi-user control scenario. The 3GPP standards do not address how a control channel search space and a blind decoding for a user is configured with respect to antenna ports, etc. For example, if all of the users in a cell are configured within a same set of RBs for control and same antenna port (like the R-PDCCH), then the control blocking rate would be high as all users would be trying to occupy the same resource. On the other hand, if all users in a cell are configured with different sets of RBs different antenna ports for DL control signaling, then there is resource wastage.

Therefore, a need exists for defining a control channel search space and/or a blind decoding configuration that can improve resource efficiency, multiplexing efficiency, and reduced and randomized control channel blocking, while also allowing a reasonable blind decoding complexity at the UE.

BRIEF DESCRIPTION OF THE DRAWINGS

FIG. 4 is a block diagram of a user equipment of the communication system of FIG. 3 in accordance with an embodiment of the present invention.

FIG. 5 is a block diagram of a base station of the communication system of FIG. 3 in accordance with an embodiment of the present invention.

FIG. 7 are block diagrams of exemplary subframe structures illustrating two approaches for a signaling of an Enhanced Packet Data Control Channel (EPDCCH) to the user equipment of FIG. 3 in accordance with various embodiments of the present invention.

FIG. 12 is a block diagram depicting an exemplary static antenna virtualization of antenna port hashing in accordance with an embodiment of the present invention.

Figure 1:
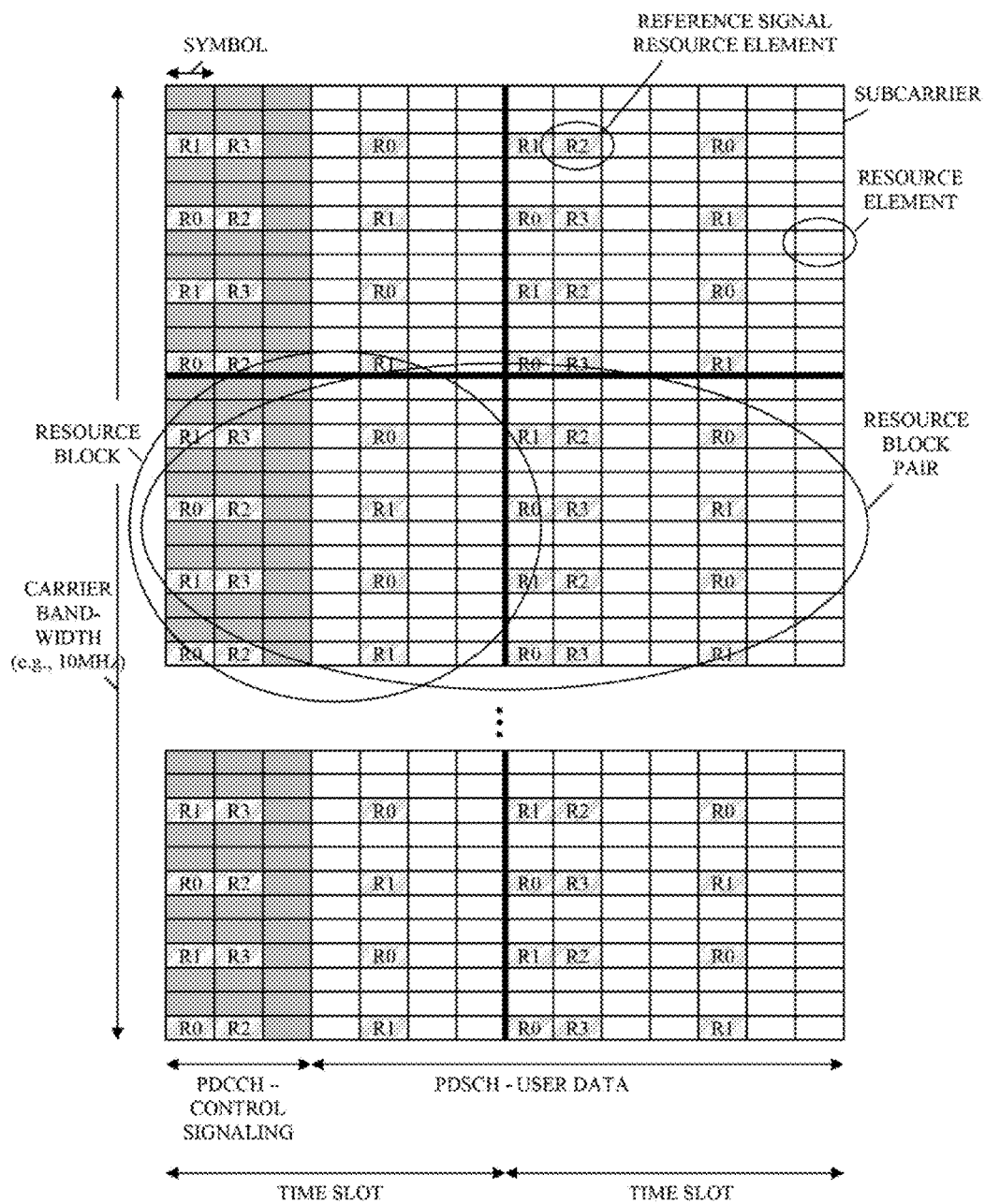
FIG. 1 is a time-frequency diagram of an exemplary subframe structure of the prior art.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

In order to address the need for defining a control channel search space and/or a blind decoding configuration that can improve resource efficiency, multiplexing efficiency, and reduced and randomized control channel blocking, while also allowing a reasonable blind decoding complexity at a user equipment (UE), a communication system is provided wherein the UE receives control information from a wireless network and decodes the received control information. More particularly, the UE receives a subframe comprising a plurality of time-frequency resources, the time-frequency resources comprising at least two control channel candidates. The UE determines a first control channel candidate of the at least two control channel candidates in the subframe, determines at least one first antenna port associated with the first control channel candidate, decodes the first control channel candidate based on the determined at least one first antenna port, determines a second control channel candidate of the at least two control channel candidates in the subframe, determines at least one second antenna port associated with the second control channel candidate, decodes the second control channel candidate based on the determined at least one second antenna port, and receives control information in one of the two control channel candidates, wherein at least one antenna port used for decoding the first control channel candidate is distinct from one antenna port used for decoding the second control channel candidate.

Generally, an embodiment of the present invention encompasses method in a UE of receiving control information from a wireless network. The method includes receiving a subframe comprising a plurality of time-frequency resources, the time-frequency resources comprising at least two control channel candidates, determining a first control channel candidate of the at least two control channel candidates in the subframe, determining at least one first antenna port associated with the first control channel candidate, and decoding the first control channel candidate based on the determined at least one first antenna port. The method further includes determining a second control channel candidate of the at least two control channel candidates in the subframe, determining at least one second antenna port associated with the second control channel candidate, decoding the second control channel candidate based on the determined at least one second antenna port, and receiving control information in one of the two control channel candidates, wherein at least one antenna port used for decoding the first control channel candidate is distinct from one antenna port used for decoding the second control channel candidate.

Another embodiment of the present invention encompasses a user equipment capable of receiving control information from a wireless network. The user equipment includes a wireless transceiver and a signal processing unit coupled to the transceiver. The signal processing unit is configured to receive a signal comprising a plurality of resource blocks and configured for receiving control information in a subframe, the subframe comprising at least a set of time-frequency resources and the control information transmitted in one or more control channel candidates comprising time-frequency resources of the set of time-frequency resources of the subframe, determine a first control channel candidate of the at least two control channel candidates in the subframe, determine at least one first antenna port associated with the first control channel candidate, and decode the first control channel candidate based on the determined at least one first antenna port. The signal processing unit further is configured to determine a second control channel candidate of the at least two control channel candidates in the subframe, determine at least one second antenna port associated with the second control channel candidate, decode the second control channel candidate based on the determined at least one second antenna port, and receives control information in one of the two control channel candidates, wherein at least one antenna port used for decoding the first control channel candidate is distinct from one antenna port used for decoding the second control channel candidate.

Figure 2:
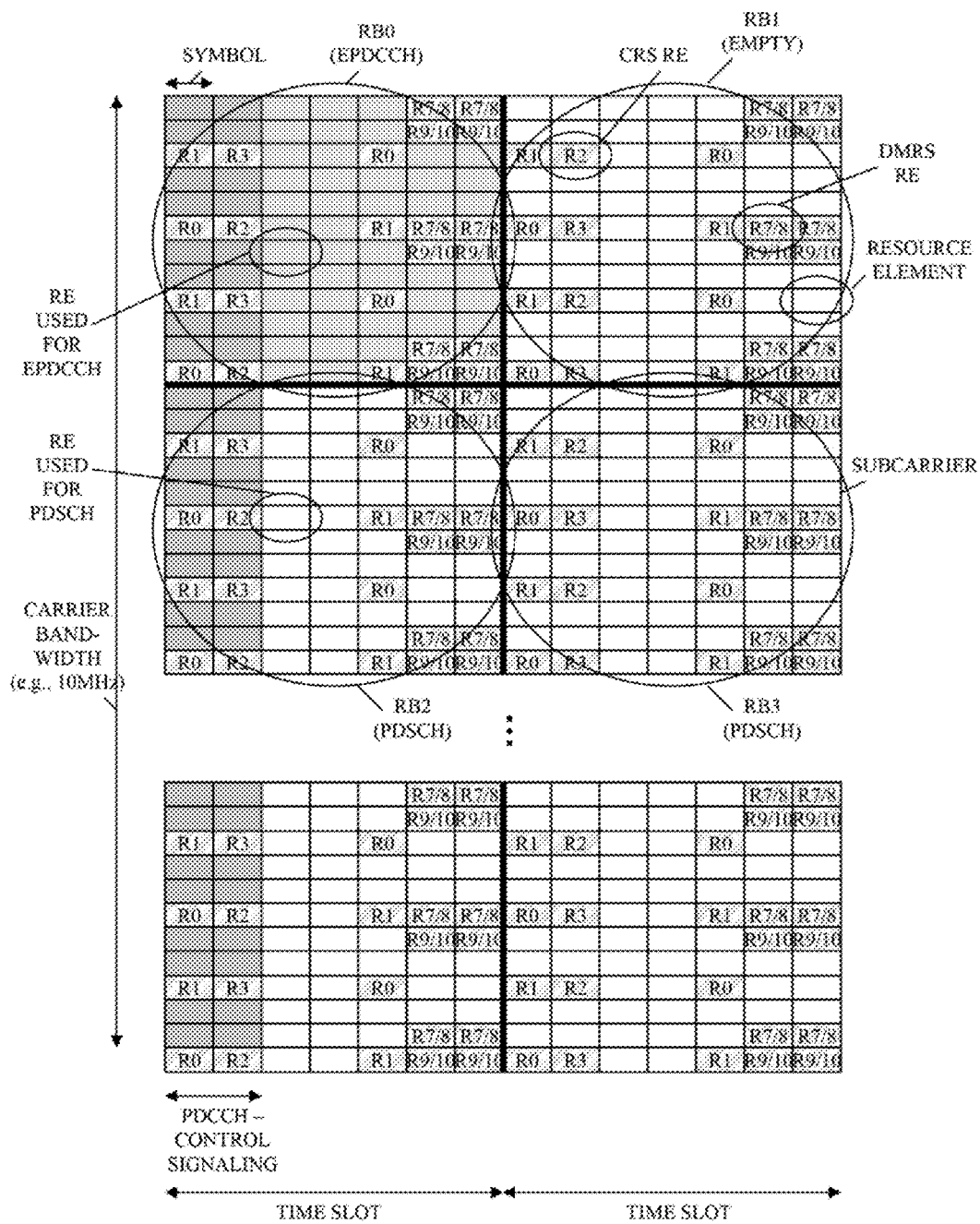
FIG. 2 is a time-frequency diagram of an exemplary OFDM subframe structure.
Figure 3:
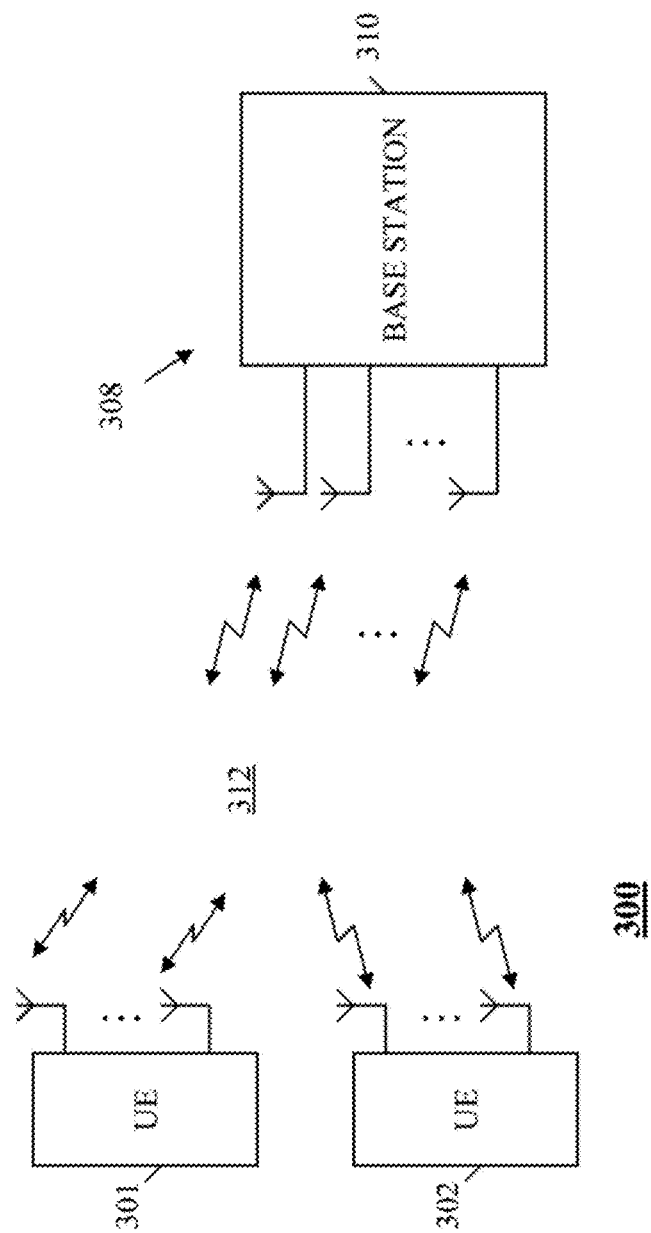
FIG. 3 is a block diagram of a wireless communication system in accordance with an embodiment of the present invention.

The present invention may be more fully described with reference to FIGS. 2-12. FIG. 2 depicts an exemplary subframe structure in which the UE expected to receive EPDCCH and PDSCH. As depicted in FIG. 2, the EPDCCH can be sent to the UE in Resource Block 0 (RB0) and the PDSCH can be sent to the UE in Resource Blocks 2 and 3 (RB2 and RB3). Resource Block 1 (RB1) is depicted as empty in FIG. 2, but RB1 can also be used to send the PDSCH or the EPDCCH to the UE. FIG. 3 is a block diagram of a wireless communication system 300 in accordance with an embodiment of the present invention. Communication system 300 includes multiple users equipment (UEs) 301, 302 (two shown), such as but not limited to a cellular telephone, a radio telephone, or a personal digital assistant (PDA), personal computer, laptop computer, or computer tablet with radio frequency (RF) capabilities. In other embodiments of the present invention, one or more of UEs 301 and 302 may be a Relay Node (RN). Communication system 300 further includes a wireless network 308 comprising a base station (BS) 310, such as a Node B, an eNodeB, an Access Point (AP), a Relay Node (RN), a Home Node B, a Home eNode B, Macro eNodeB (MeNB), Donor eNodeB (DeNB), femtocell, femto-node, pico-cell, network node or a Base Transceiver Station (BTS) (the terms BS, eNodeB, eNB, and NodeB are used interchangeably herein), or by other terminology used in the art that includes an antenna array comprising multiple antennas and that supports Multiple-Input Multiple-Output (MIMO) communication, BS 310 provides communication services, via a corresponding air interface 312, to users' equipment, such as UEs 301 and 302, residing in a coverage area, such as a cell or a sector of a cell, served by the BS. BS 310 can also each be referred to as a transmission point (TP) with a certain number of antennas. BS may comprise one or more transmitters and one or more receivers that serve the UEs. UEs may also comprise one or more transmitters and one or more receivers.

Air interface 312 comprises a downlink and an uplink. Each of the downlink and the uplink comprises multiple physical communication channels, including multiple control/signaling channels, such as a Physical Downlink Control Channel (PDCCH) and an Enhanced-PDCCH (EPDCCH) of the downlink, and multiple traffic channels, such as a downlink shared traffic channel, for example, a Physical Downlink Shared Channel (PDSCH). As used herein, use of the term EPDCCH is intended to include a Relay Physical Downlink Control Channel (R-PDCCH), which provides downlink control information (DCI) to an RN. Other signals and channels such as synchronization signals, broadcast control channels, including primary broadcast control channel (PBCH), etc may also be present in a subframe. Typically, the master information block (MIB) is sent on the Physical Broadcast CHannel (PBCH), the MIB comprises of system frame number (SFN), downlink system bandwidth, and Physical Hybrid ARQ Channel (PHICH) configuration (such as duration and PHICH resource indicator). In LTE Release-8, the PBCH is sent on subframe 0 (each subframe comprised of two slots, each slot with duration of 0.5 milli-seconds) of a radio frame. The Synchronization signals are transmitted within the inner six PRBs or inner 72 subcarriers (i.e. approximately 1.1 MHz) of the carrier bandwidth on subframes 0 and 5 of radio frame. The exact location of the Synchronization signals changes based on the duplex type, and Cyclic Prefix length, etc.

Referring now to FIGS. 4 and 5, block diagrams are provided of a UE 400, such as UEs 301 and 302, and BS 310 in accordance with various embodiments of the present invention. Each of UE 400 and BS 310 includes a respective signal processing unit 402, 502, such as one or more microsignal processing units, microcontrollers, digital signal processing units (DSPs), combinations thereof or such other devices known to those having ordinary skill in the art. The particular operations/functions of signal processing units 402 and 502, and respectively thus of UE 400 and BS 310, are determined by an execution of software instructions and routines that are stored in a respective at least one memory device 404, 504 associated with the signal processing unit, such as random access memory (RAM), dynamic random access memory (DRAM), and/or read only memory (ROM) or equivalents thereof, that store data and programs that may be executed by the corresponding signal processing unit.

Each of UE 400 and BS 310 further includes a respective one or more transceivers 406, 506 coupled to the signal processing unit 402, 502 of the UE or BS and that exchange wireless signals between the UE and BS over air interface 312, such as the PDCCH, EPDCCH, and the PDSCH. UE 400 further includes multiple antennas 408 and supports MIMO communications. BS 310 further includes an antenna array 510 that comprises multiple antennas 512. By utilizing an antenna array to transmit signals to a UE located in a coverage area of the BS, such as a cell or sector serviced by the antenna array, the BS is able to utilize MIMO techniques for the transmission of the signals.

In a conventional sense, the term 'antenna port' typically has been used to refer to a 'physical' antenna port at BS 310. A reference signal is usually associated with (i.e., transmitted from) an antenna port, which allows a UE, such as UEs 301 and 302, to make measurements on that antenna port, and thereby estimate a channel from the corresponding antenna port to the UE's receivers. In the 3GPP specifications, the definition of 'antenna ports' has an expanded scope to deal with some new concepts. An antenna port is defined such that a channel over which a symbol on the antenna port is conveyed can be inferred from the channel over which another symbol on the same antenna port is conveyed. An antenna port could correspond to any well-defined description of a transmission from one or more of antennas. As an example, it could include a beamformed transmission from a set of antennas with antenna weights being applied, where the set of antennas itself could be unknown to the UE. In this case, the effective channel can be learned from a dedicated reference signal (DRS), also known as a demodulation reference symbol or demodulation reference signal, sent from an associated antenna port. The dedicated reference signal may be beamformed similar to the beamformed data transmission with the same antenna weights being applied to the set of antennas. Typically, a reference signal is associated with an antenna port for the purpose of measurement or channel estimation or determination at the UE.

BS 310 further includes a weighter 508 in association with transceiver 506, such as a precoder or any other type of signal weighter, that is in communication with signal processing unit 502 and that is interposed between antenna array 510 and transceiver 506. In another embodiment of the present invention, weighter 508 may be implemented by signal processing unit 502. Weighter 508 weights signals applied to the multiple antennas 512 of antenna array 510 based on channel state information (CSI) fed back by a UE, such as UEs 301 and 302, for example, codebook feedback such as a codebook index and a rank index, statistical feedback such as a covariance matrix or any other type of matrix, eigenvectors, or channel quality mean and variance, a received signal quality information, a channel frequency response, or any other type of channel feedback known in the art, in order to predistort and beamform the signals for transmission to the UE over the downlink of the intervening air interface.

When weighter 508 comprises a precoder, each of UEs 301 and 302 and BS 310 may further maintain, in their respective at least one memory devices 404 and 504 and/or in weighter 508, a precoding matrix, which precoding matrix comprises multiple sets of matrices and wherein each set of matrices is associated with a combination of antennas for downlink transmission and with weights applicable to each antenna. Precoding matrices are well-known in the art and will not be described in greater detail. Based on the channel conditions measured by a UE, the UE reports back a precoding metric, preferably a Precoding Matrix Indicator (PMI), for a group of resource elements (REs) where an RE is a time-frequency resource such as a 1 subcarriers in frequency by 1 OFDM symbols in time, and an RB is time-frequency resource such as 12 subcarriers in frequency by one slot in time (where a slot is 0.5 ms duration, and up to 7 OFDM symbols in time). An RB pair is a time-frequency resource such as 12 subcarriers in frequency by one subframe in time (a subframe is 1 ms duration). Typically, the RB and RB pairs are defined to occupy resources not occupied by PDCCH, or other known signals such as Synchronization signals, etc. A resource block (RB) is typical unit in which the resource allocations are assigned for the uplink and downlink communications. In determining a precoding metric for a group of REs, the UE computes a set of complex weights based on the measured channel conditions. The set of complex weights can be Eigen Beamforming vectors derived from downlink reference signal measurements. The complex weights are mapped to a set of already defined vectors, that it, to a nearest vector of the set of already defined vectors, to produce a precoding vector. The UE then conveys the index of the precoding vector selected by the UE using an uplink control channel. In certain cases, the beamforming or precoding applied at the BS may be transparent to the UE i.e. the UE need not know what precoding weights are used by the BS for a particular transmission on the downlink.

The embodiments of the present invention preferably are implemented within UEs 301 and 302 and BS 310, and more particularly with or in software programs and instructions stored in the at least one memory devices 404, 504 and executed by signal processing units 402, 502 of the UEs and BS. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 301 and 302 and BS 310. Based on the present disclosure, one skilled in the art will be readily capable of producing and implementing such software and/or hardware without undo experimentation.

Communication system 300 comprises an Orthogonal Frequency Division Multiple Access (OFDMA) modulation scheme for transmitting data over air interface 312, wherein a frequency channel, or bandwidth, is split into multiple physical resource blocks (PRBs) during a given time period. Each physical resource block (PRB) comprises multiple orthogonal frequency sub-carriers over a given number of OFDM symbols, that are the physical layer channels over which traffic and signaling channels are transmitted in a TDM or TDM/FDM fashion. A communication session may be assigned a PRB or a group of PRBs for an exchange of bearer information, thereby permitting multiple users to transmit simultaneously on the different PRBs such that each user's transmission is orthogonal to the other users' transmissions. A PRB also may be assigned to multiple users in which case the users are no longer orthogonal but they can be separated based on spatial signatures of the individual transmit weights. While the description uses PRB to describe the control channel operation, each physical resource block is associated with a virtual resource block (or VRB) and the association is given by a VRB to a PRB mapping e.g. via a mapping rule. Thus, the concept of port hashing may instead be defined based on the VRB index. The VRB index may be considered as a resource block indexing in a logical domain. Virtual resource blocks of localized type are mapped directly to physical resource blocks whereas Virtual resource blocks of distributed type are mapped to physical resource blocks using an interleaving rule. The resource allocations can be localized or distributed, where the former may be used typically for frequency-selective scheduling, while the latter may be targeted towards enabling frequency-diverse scheduling.

In addition, communication system 300 preferably operates according to the Third Generation Partnership Project (3GPP) Long Term Evolution-Advanced (LTE-A) standards, which standards specify wireless telecommunications system operating protocols including radio system parameters and call processing procedures, and implements coordinated multipoint transmission (CoMP). As such, the PDCCH may be considered to be, and also is referred to herein, as a 'legacy control channel' as the PDCCH is a control channel utilized by earlier 3GPP communication systems, and the EPDCCH is an 'enhanced control channel,' and is also referred to herein as such, created by use in the latest proposed 3GPP LTE-A communication systems. However, those who are of ordinary skill in the art realize that communication system 300 may operate in accordance with any wireless telecommunication standard employing an Orthogonal Frequency Division Multiplexing (OFDM) modulation scheme, such as but not limited to other 3GPP communication systems employing channel estimation and received signal demodulation and channel quality feedback based on the channel estimation, a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE 802.xx standards, for example, the 802.11a/HiperLAN2, 802.11g, or 802.20 standards, or a Worldwide Interoperability for Microwave Access (WiMAX) communication system that operates in accordance with the IEEE (Institute of Electrical and Electronics Engineers) 802.16 standards, including 802.16e and 802.16m.

Among the signals being multiplexed and transmitted to UEs 301 and 302 from BS 310 are reference or pilot signals which may be multiplexed with other control information and user data. Reference signals, and more particularly Common Reference Signals (CRSs) and UE specific reference Signals (UERSs) or Demodulation reference Signals (DMRSs) or Dedicated reference signals (DRS), are sent from antennas of a serving BS, that is, BS 310, to a served UE, such as UEs 301 and 302, in order for the UE to demodulate received user data and to determine channel state information (CSI) that is fed back to a serving BS. Additionally, with respect to CoMP transmissions, the UE may need to determine CSI for multiple transmission points or multiple BSs as well.

Figure 6:
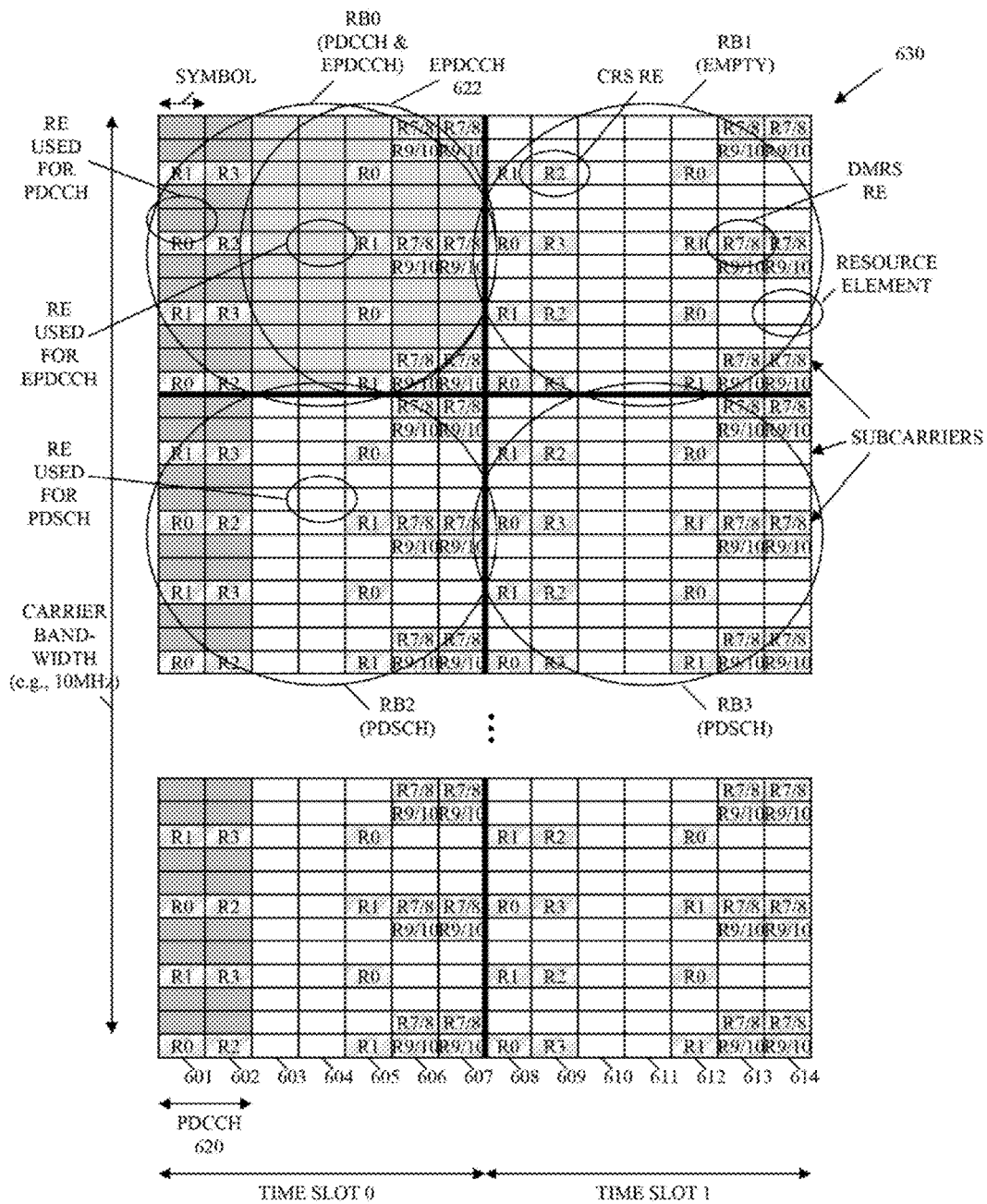
FIG. 6 is a time-frequency diagram of an exemplary OFDM subframe structure employed by the communication system of FIG. 3 and that illustrates reference signal placement within a subframe in accordance with an embodiment of the present invention.

Referring now to FIG. 6, a time-frequency diagram 600 is provided of an exemplary subframe structure that depicts exemplary distributions of reference signals, and particularly Common Reference Signals (CRSs) and UE specific reference signals (UERSs) or Demodulation reference signals (DMRS), in time-frequency resources, such as Resource Blocks (RBs), of a OFDMA subframe 630 that may be employed by communication system 300 in accordance with various embodiments of the present invention. A vertical scale of time-frequency diagram 600 depicts multiple blocks of frequency, or frequency bins, (frequency subcarriers) of the subframe that may be allocated. A horizontal scale of time-frequency diagram 600 depicts multiple blocks of time (in units of OFDM symbols) 601-614 of the subframe that may be allocated. Subframe 630 comprises multiple physical resource blocks (PRBs, or RBs), such as Resource Block 0 (RB0), Resource Block 1 (RB1), Resource Block 2 (RB2), and Resource Block 3 (RB3), wherein each RB comprises 12 OFDM subcarriers over a time slot comprising up to seven (7) OFDM symbols. Typically, the subframe duration is 1 ms and it consists of two time slots of 0.5 ms duration each. In turn, each RB is divided into multiple resource elements (REs), wherein each RE is a single OFDM subcarrier, or frequency bin, on a single OFDM symbol. Further, subframe comprises multiple control regions for the transmission of control information, that is, a first region 620 comprising the first two symbols of subframe 630 and corresponding to the PDCCH, and a second region 622 comprising a portion of RB0 and corresponding to the EPDCCH (that is, the portion of RB0 not allocated to the PDCCH or RB0 may alternately be defined over the non-control region only i.e. excluding the resources assigned for PDCCH). The remaining RBs/symbols of subframe 630, such as RBs 1, 2, and 3, are used for transmission of user data, that is, are used for the Physical Downlink Shared Channel (PDSCH). More generally, the control region corresponding to PDCCH can comprise the first, first two, or first three, or first four symbols of the subframe and the control region corresponding to EPDCCH can comprise multiple RBs in the subframe (i.e., portions of those RBs not allocated to PDCCH or P/SCH or PBCH) in time symbols that are distinct from the time symbols comprising the PDCCH control region.

For LTE Release 11, a UE, such as UEs 302 and 301, is expected to receive the EPDCCH in a set of RBs that may span only a portion of the carrier bandwidth in frequency domain. As depicted in subframe 630, the UE may expect to receive the EPDCCH and the PDSCH, wherein the EPDCCH is sent to the UE in RB0 and the PDSCH is sent to the UE in RB2 and RB3. RB1 is depicted as empty in FIG. 6, but RB1 can also be used to send the PDSCH or the EPDCCH to the UE.

In order to decode the information sent on the PDCCH, a UE, such as UEs 302 and 301, needs to perform channel estimation after receiving the PDCCH. To perform channel estimation, the UE receives Reference Signals (RSs) that are included in the subframe. The RSs are associated with one or more antenna ports. For example, as depicted in FIG. 6, RSs labeled R0 are resource elements carrying reference signals associated with antenna port 0, RSs labeled R1 are resource elements carrying reference signals associated with antenna port 1, RSs labeled R2 are resource elements (REs) carrying reference signals associated with antenna port 2, and RSs labeled R3 are resource elements (REs) carrying reference signals associated with antenna port 3. The RSs associated with antenna ports 0, 1, 2, and 3 are typically referred to as "Common Reference Symbols (CRSs)." In order to demodulate user data (sent on PDSCH), 3GPP LTE Release 10 provides that a UE, such as UEs 302 and 301, can either use the RSs associated with antenna ports 0, 1, 2, and 3 or can use RSs associated with other antenna ports, such as antenna ports 7, 8, 9, 10, 11, 12, 13, and 14, that is, the UE can use RSs associated with all or a subset of these antenna ports, based on the transmission scheme used for PDSCH reception (in turn, the transmission scheme depends on configuration signaling from the serving BS, that is, BS 310). The RSs associated with these other antenna ports 7, 8, 9, 10, 11, 12, 13, and 14 are typically referred to as "UE specific reference signals (UERSs)" or "Demodulation reference signals (DMRSs) or Dedicated reference signals (DRS)." Unlike the PDCCH, which is received by the UE using CRS, the EPDCCH is received by the UE using DMRS.

That is, as depicted in FIG. 6, REs labeled R0-R3 (and associated with antenna ports 0-3, respectively) are allocated to CRSs (CRS REs) and REs labeled R7-R10 (and associated with antenna ports 7-10, respectively) are allocated to DMRSs (DMRS REs). It should be understood that RSs corresponding to a group of antennas may be mapped into the set of available REs using any multiplexing method known in the art or a combination thereof, for example, either code division multiplexing (CDM) or frequency/time division multiplexing where each individual antenna reference signal occupies a different RE. For example, RSs corresponding to antenna ports 7 and 8 are multiplexed using CDM and are mapped to the same REs in time and frequency domain. Subframe 630 also includes other RSs that are distributed in the control regions and/or user data regions of the subframe. These other RSs may be present but are not necessarily used for demodulation of received signals by a UE in an LTE-A communication system. For example, these RS may include the CSI-RS, muted RS where the UE shall assume and zero transmission power on the RS REs that may be useful for interference measurements, positioning RS that may be used for detecting location information, etc.

Further, as depicted in FIG. 6, RSs corresponding to an antenna port are allocated to a resource element (RE) pair in user data regions, and more particularly to one of the RE pairs associated with OFDM symbols 606-607 and 613-614. For example, as depicted in FIG. 6, pairs of adjacent DMRS RE labeled as R7/8 may be allocated to antenna port 7 or antenna port 8 and pairs of adjacent DMRS RE labeled as R9/10 may be allocated to antenna port 9 or antenna port 10. In this example, the RS for R9 and R10 are code-division multiplexed using orthogonal Walsh codes. Similarly, the RS for R7 and R8 are code-division multiplexed using orthogonal Walsh codes.

Figure 7:
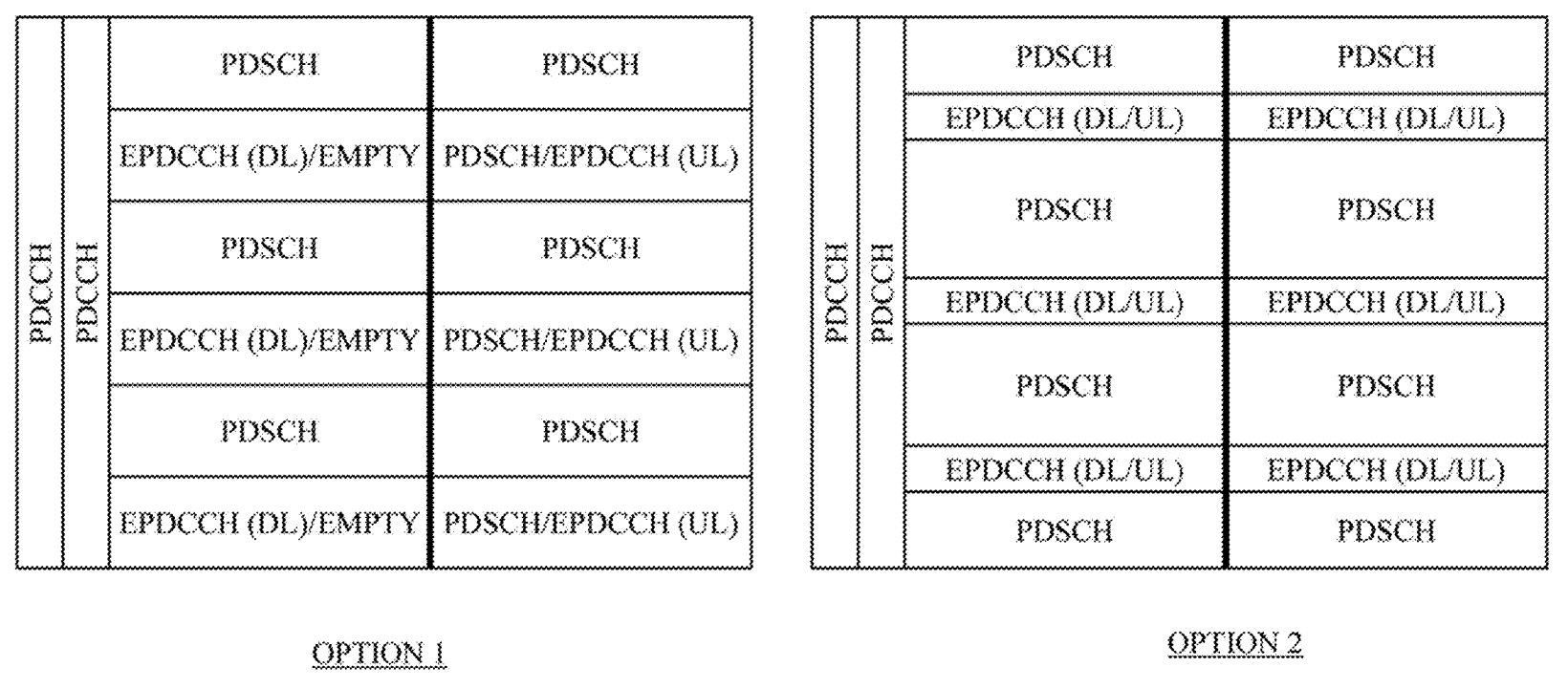

UEs 301 and 302 are expected to monitor the EPDCCH in a control region, that is, EPDCCH control region 622, that is distinct from the control region used for PDCCH, that is, PDCCH control region 620. The control region corresponding to EPDCCH can span multiple RBs in the subframe. The control region corresponding to EPDCCH typically spans time symbols that are distinct from the time symbols corresponding to PDCCH. For example in FIG. 6, the control region corresponding to PDCCH spans time symbols 601, 602 and the control region corresponding to EPDCCH can span multiple RBs in frequency domain and symbols 603-607 or alternately, symbols 603-614 in time domain. To receive the EPDCCH in control region 622, each UE 301, 302 has to perform blind decoding for several EPDCCH candidates in the control region. Referring now to FIG. 7, a block diagram is provided of exemplary subframe structures that illustrate two approaches for signaling of the EPDCCH to a UE in accordance with various embodiments of the present invention. In a first approach of the two approaches, that is, Option 1, DL assignments signaled to a UE, such as UEs 301 and 302, are restricted to a first time slot (time slot 0), and uplink (UL) grants are restricted to a second time slot (time slot 1). In a second approach of the two approaches, that is, Option 2, both DL assignments and UL grants can be signaled to a UE, such as UEs 301 and 302, in either the first time slot or the second time slot. In yet another option, DL assignments (or UL grants) can occupy both slots.

To receive EPDCCH using either approach depicted in FIG. 7, a UE first needs to know a set of RBs on which the new control signaling is expected, that is, an EPDCCH RB set. However, in order to reduce the blind decoding complexity at a UE, communication system 300 provides that when the UE searches for different control channel candidates for blind decoding in a subframe, the UE uses at least two different antenna ports for two different candidates. The UE then may determine antenna port for a control channel candidate as a function of the Resource Block (RB) or Control Channel Element (CCE) index of an RB or a CCE contained in the candidate.

Figure 8:
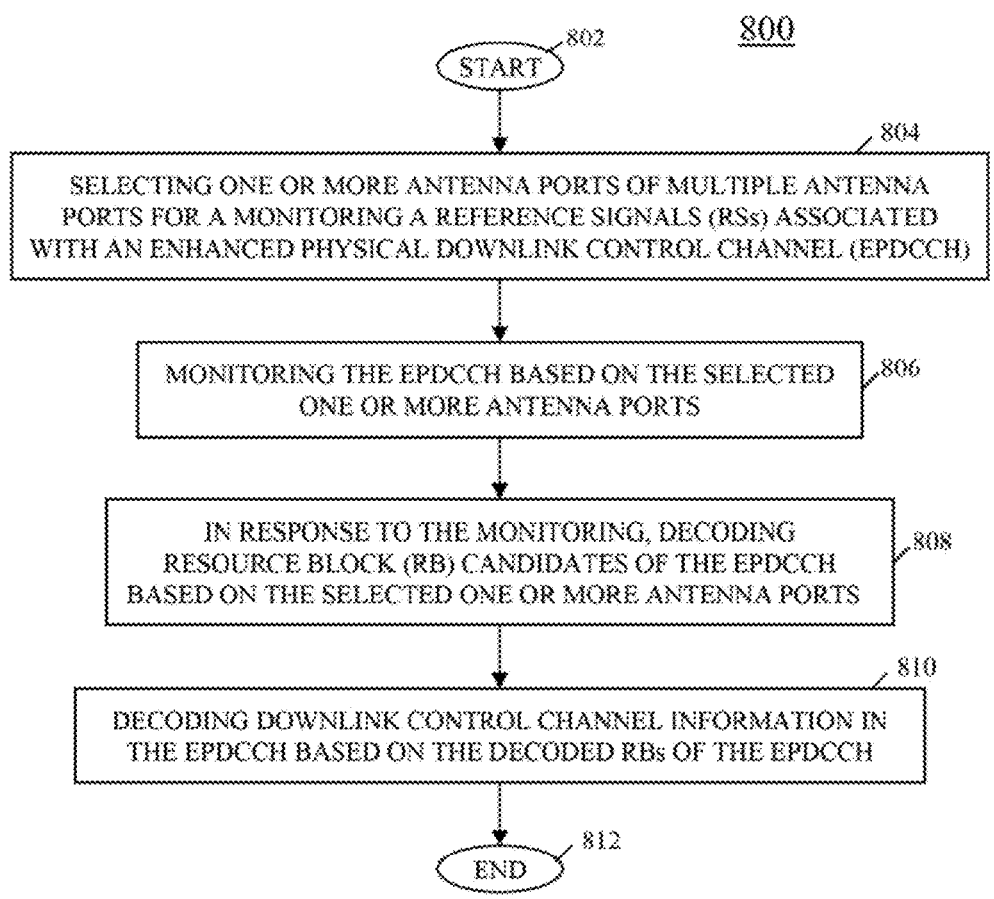
FIG. 8 is a logic flow diagram illustrating blind decoding performed by a user equipment of the communication system of FIG. 3 based on antenna port hashing and in order to decode control information sent on the EPDCCH in accordance with various embodiments of the present invention.

Referring now to FIG. 8, a logic flow diagram 800 is provided that illustrates blind decoding performed by a UE of communication system 300, such as UE 301, based on antenna port hashing and in order to decode control information sent on the EPDCCH in accordance with various embodiments of the present invention. While the operation of communication system 300 is described with respect to UE 301, UE 301 is being used to illustrate the operation of the communication system and the one of ordinary skill in the art realizes that the functions performed by UE 301 herein also may be performed by any other UE of communication system 300, such as UE 302.

Logic flow 800 begins (802) when UE 301 monitors the downlink of air interface 312 for the EPDCCH. In particular, UE 301 selects (804) one or more antenna ports of multiple antenna ports for a monitoring of RSs in the EPDCCH of the downlink of air interface 312 for the EPDCCH and then monitors (806) the EPDCCH based the selected one or more antenna ports. As described in greater detail below, the UE uses antenna port hashing to select the one or more antenna ports to monitor. In response to monitoring and based on the selected one or more antenna ports, the UE blindly decodes (808) RB candidates of the EPDCCH, and then receives and decodes (810) downlink control information (DCI) in the EPDCCH based on the decoded RBs of EPDCCH. Logic flow diagram 800 then ends (812).

That is, as depicted in FIG. 7, two exemplary subframe structures for DMRS-based control channels, that is, the EPDCCH, are Option 1 (R-PDCCH like structure as depicted in Option 1 of FIG. 7, where a downlink (DL) grant is restricted to a first time slot and an uplink (UL) grant restricted to 2nd slot, and Option 2, which provides for Frequency Division Multiplexing (FDM) control with both the DL and the UL grants allowed in both time slots. A Bitmap then may be used to indicate the RBs on which EPDCCH is expected, that is, a UE search space for candidates for blind decoding. It is possible to allow frequency-selective search space candidates, such as RBs to be searched for RSs that are candidates for blind decoding by a UE, for example, where there are one (1) and two (2) RB candidates, and frequency-distributed search space candidates, for example, where there are four (4) or eight (8) RB candidates, with potential for multiplexing efficiency via a UE-specific hashing function. While the two examples are given above, it is also possible to create a hybrid scheme where two CCEs per PRB pair and the REs for the two CCEs are interleaved in distributed fashion, for example, where both CCEs span the two slots.

Each EPDCCH blind decode is performed on a search space candidate. Each search space candidate has an associated set of time-frequency resources, such as Resource Elements (REs), Control Channel Elements (CCEs), or Resource Blocks (RBs), in a subframe, and/or optionally may have one or more of an associated Downlink Control Information (DCI) format, an associated modulation order, and an associated DMRS port index, that is used for demodulation. The number of candidates to be blindly decoded, that is, a blind decoding complexity, can become large if each parameter associated with selecting the candidates for blind decoding, that is, the time-frequency resources (again, for example, RBs), DCI Format, modulation order, and/or DMRS port index, is allowed to vary and take on a large number of values. Therefore, communication system 300 controls the complexity of a blind decoding process by placing restrictions on the parameter combinations. For example, the modulation order may be fixed to QPSK (Quadrature Phase Shift Keying) for control channel transmission (although other modulation schemes, such as 16-QAM (Quadrature Amplitude Modulation), etc., may also be used if there is a desire by an operator of communication system 300 to increase efficiency). For RPDCCH, the DMRS port index was fixed to antenna port 7 for all control channel candidates.

For EPDCCH with no cross-interleaving (like in the case the RPDCCH), the search space for candidates for blind decoding in the time-frequency domain may be defined as to occupy a small set of RBs, such as one (1), two (2), four (4), or eight (8) RBs, and the set of RBs configured for control channel transmission may be signaled by BS 310 to UE 301 over the downlink of air interface 312 using the Radio Resource Control (RRC) protocol. Thus, per time slot, the EPDCCH defines a set {6, 6, 2, 2} of candidates for blind decoding and up to two DCI formats per candidate, resulting in '(6+6+2+2)*2=32' blind decoding attempts per time slot. That is, the blind decoding candidate set {6,6,2,2} corresponds to six single (1)-PRB aggregation levels, wherein six individual PRBs are blindly decoded, six two (2)-PRB aggregation levels, wherein six pairs of PRBs are blindly decoded, two four (4)-PRB aggregation levels, wherein two quadruplets of PRBs are blindly decoded, and two eight (8)-PRB aggregation level, wherein two octuples of PRBs are blindly decoded.

The aggregated RBs for each aggregation level may be given by a numbering scheme as defined in the table below (specifically for an EPDCCH like the R-PDCCH) for the higher layer configured set of RBs. Additionally, in the case of an RN, a fixed antenna port, that is, antenna port 7 (AP7), and a fixed scrambling identifier (ID), that is scrambling ID 0, is assumed for receiving control information (that is, no MU-MIMO). Further, the scheme defined below assumes option 1 above where the DL grants are sent in a first time slot and UL grants are sent in a second time slot.

In each time slot, an EPDCCH candidate m, wherein m=0, 1, . . . , M(Λ)−1 at an aggregation level Λ, comprises a Virtual Resource Block (VRB) that may be numbered as $n^{RPDCCH} = (\Lambda \cdot m+i) \mod N^{RPDCCH}$, where m is the number of the VRB, M(Λ) is the number of candidates, i=0, 1, . . . , (Λ−1), and M(Λ) is given from the following table of 3GPP Technical Specification (TS) 36.216:

| E-PDCCH candidates monitored by a relay node | |
|---|---|
| Aggregation level Λ | Number of R-PDCCH candidates M (Λ) |
| 1 | 6 |
| 2 | 6 |
| 4 | 2 |
| 8 | 2 |

Figure 9:
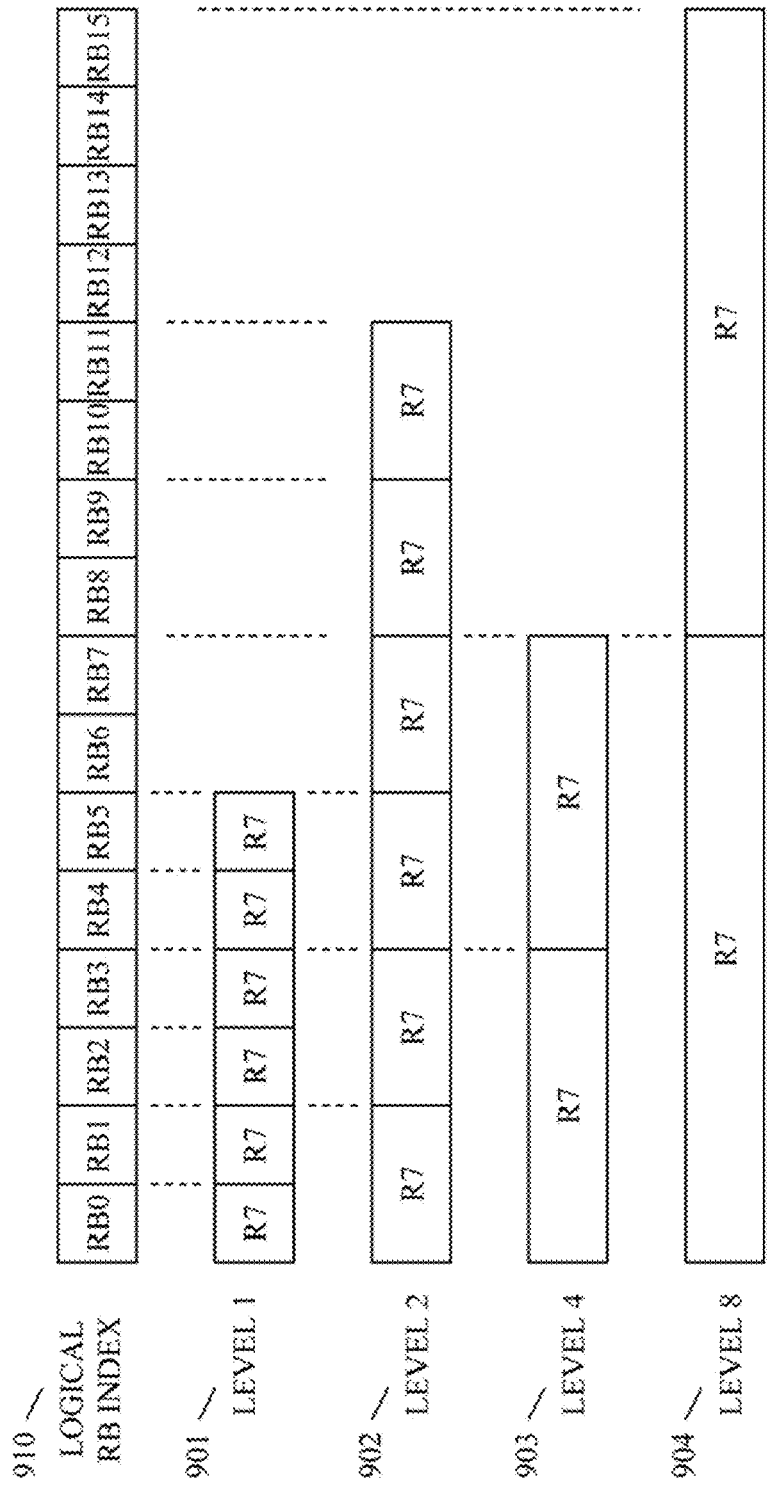
FIG. 9 is a block diagram illustrating search space candidates for different aggregation levels of the EPDCCH in accordance with an embodiment of the present invention.

To better illustrate this scheme and the aggregation levels, a block diagram 900 is provided in FIG. 9 that illustrates search space candidates for different aggregation levels of the EPDCCH in accordance with an embodiment of the present invention. At the top of FIG. 9 is a Logical RB index 910, listing logical RBs RB0-RB15. FIG. 9 then depicts four aggregation levels 901-904, that is, Levels 1, 2, 4, and 8, respectively. Level 1 corresponds to six single (1)-PRB aggregation levels (wherein six individual PRBs are blindly decoded), which individual PRBs may be correspondingly indexed by individual logical RBs, that is, RB0-RB5. Level 2 corresponds to six two (2)-PRB aggregation levels, wherein six pairs of PRBs are blindly decoded, which pairs of PRBs may be correspondingly indexed by pairs of logical RBs, that is, RB0/RB1, RB2/RB3, RB4/RB5, and so on. Level 4 corresponds to two four (4)-PRB aggregation levels, wherein two quadruplets of PRBs are blindly decoded, which quadruplets of PRBs may be correspondingly indexed by quadruplets of logical RBs, that is, RB0/RB1/RB2/RB3 and RB4/RB5/RB6/RB7. And Level 8 corresponds to two eight (8)-PRB aggregation level, wherein two octuples of PRBs are blindly decoded, which octuples of PRBs may be correspondingly indexed by octuples of logical RBs. While the indexing logical RBs depicted in FIG. 9 are consecutive, they need not be such. It is assumed in FIG. 9 that a fixed antenna port, that is, antenna port 7 (depicted in FIG. 9 as R7) is used for receiving control information.

To allow multiple UEs, such as UEs 301 and 302, to concurrently use the EPDCCH Resource Block, it may be desirable to multiplex two (or more) EPDCCHs addressed to two different users in a single PRB. This can be done by using two antenna ports for conveyance of DMRSs (an antenna port used to convey a DMRS also is referred to herein as a 'DMRS port'), such as antenna ports 7 and 8, wherein DMRS port 7 ('R7') is addressed to a first user, such as UE 301, and DMRS port 8 ('R8') is addressed to a second user, such as UE 302. A UE may then assume a particular DMRS port to decode a particular EPDCCH candidate, as trying every possible DMRS port for every candidate may lead to an excessive number of blind decodes. For example, if control channel candidates are defined for 100 RBs, four Antenna Ports, and to monitor two DCI Format sizes, then the number of Blind decoding attempts (assuming only RB EPDCCH candidates) is 100×4×2=800, which is excessively large and can cause significant false detections, leading to system performance loss.

The DMRS port that each UE 301, 302 uses to decode the CCE(s) within a PRB (or a set of PRBs), also referred to herein as a DMRS port index, can be determined by the UE based on an RB index of the PRB and/or other parameters such as a subframe index and a UE identifier (UEID). Still other parameters that may be considered by the UE in determining a DMRS port to use to decode the CCE(s) may also include a first RB index or a last RB index associated with the control channel candidate, a set of RBs associated with the control channel candidate, an associated DCI format hypothesis (that is, a DCI format that the UE guesses was used), a System Frame Number, a Slot Number, a Cell Identifier, a Point Identifier, any other type of UE Identifier, a higher layer offset identifier, a control antenna port identifier sent via a legacy PDCCH, a control port hopping pattern, restricted ports signaled via higher layer signaling, and a CSI-RS (Channel State Information-Reference Signal) configuration. Using these parameters to determine a DMRS port to use to decode the CCE(s) may be referred to herein as 'DMRS transmission port hashing.' Note that the Resource block index may be one of a VRB index, DVRB index or a LVRB index.

For example, in one embodiment of the present invention, the UE may choose to use DMRS port 7 or 8 (that is, R7 or R8) based on whether a PRB has an odd or even index number, for example, using DMRS port 7 for odd PRBs (PRBs with an odd index number) and DMRS port R8 for even PRBs (PRBs with an even index number). In another such embodiment of the present invention, the UE may reverse this every subframe. By way of yet another, more generic embodiment of the present invention, the UE may determine a DMRS port index number based on an algorithm wherein an RB index (RB_Index) and an associated DMRS port index are configured as follows: {(RB_Index1, DMRS port Indices(RB_Index1)), (RB_Index2, DMRS port Indices(RB_Index2)), . . . }. In still another embodiment of the present invention, the UE may determine the DMRS port index by means of a deterministic mapping function, wherein the DMRS port index (port-index) is a function of one or more of an RB index (RB_index), a slot index (slot_index), a UE identifier (UE_ID), and a signaled parameter, (that is, port_index=function(RB_index, slot_index, UE_ID, signaled_parameter), where the signaled parameter can be a BS 310-signaled parameter.

While the DMRS port corresponding to each RB and/or scrambling identifier (ID) can be signaled to the UE via RRC, such an approach is limited with respect to multi-user situations. Therefore, in other embodiments of the present invention, UE can assume a fixed scrambling ID, for example, scrambling ID 0, while decoding E-PDCCH, or the scrambling ID may also be defined as part of the port definition. It is also possible to include the scrambling ID used for transmission of control channels in a Master Information Block (MIB) or a System Information Block (SIB), such as a SIB-x (where x=1, 2, 3, . . . , L and each value of x is a distinct SIB). In still other embodiments of the present invention, the UE can try different DMRS ports and different scrambling IDs for each or subset of CCE combinations in PRB pair; however, as mentioned before, this leads to an excessive number of many blind decodes.

Figure 10:
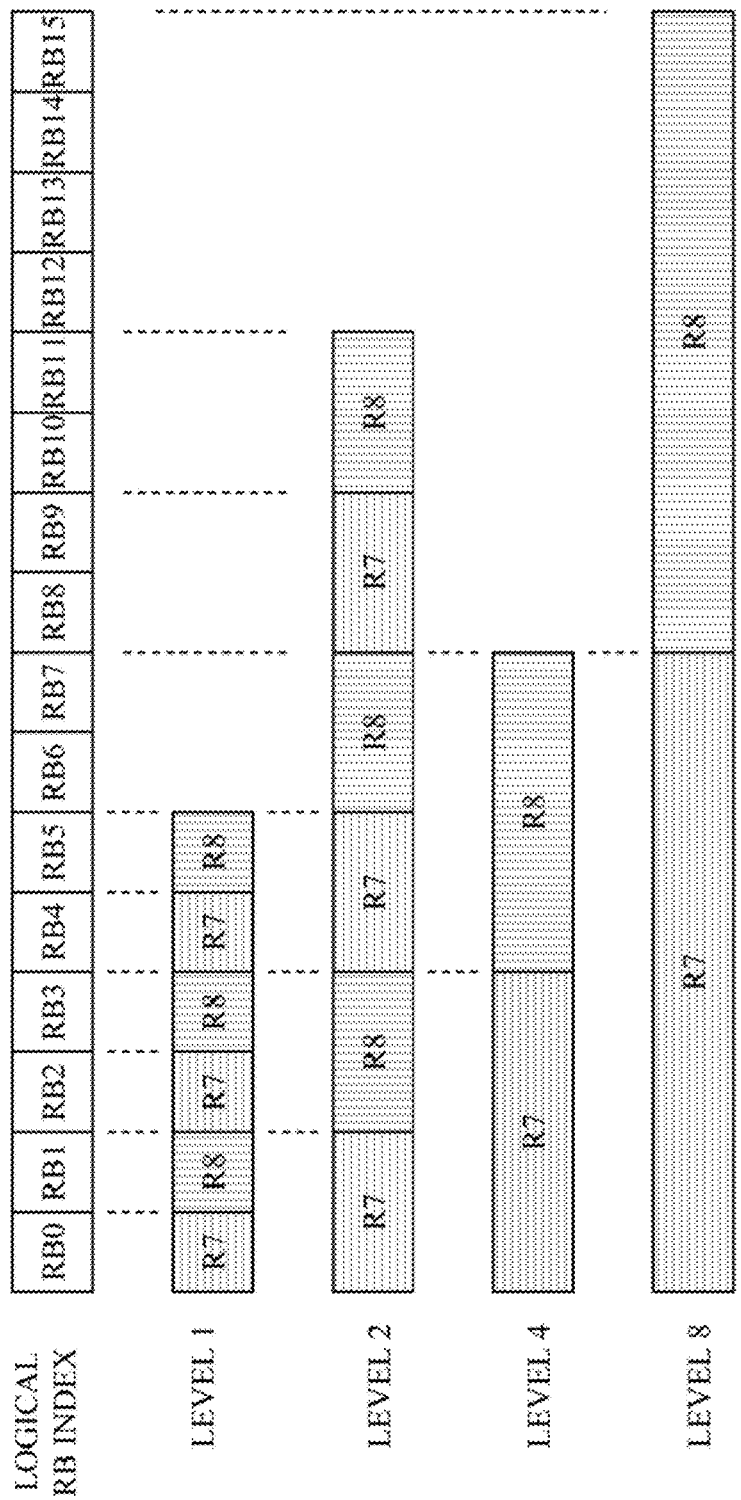
FIG. 10 is a block diagrams illustrating how a user equipment of the communication system of FIG. 3 may perform antenna port hashing in accordance with various embodiments of the present invention.
Figure 11:
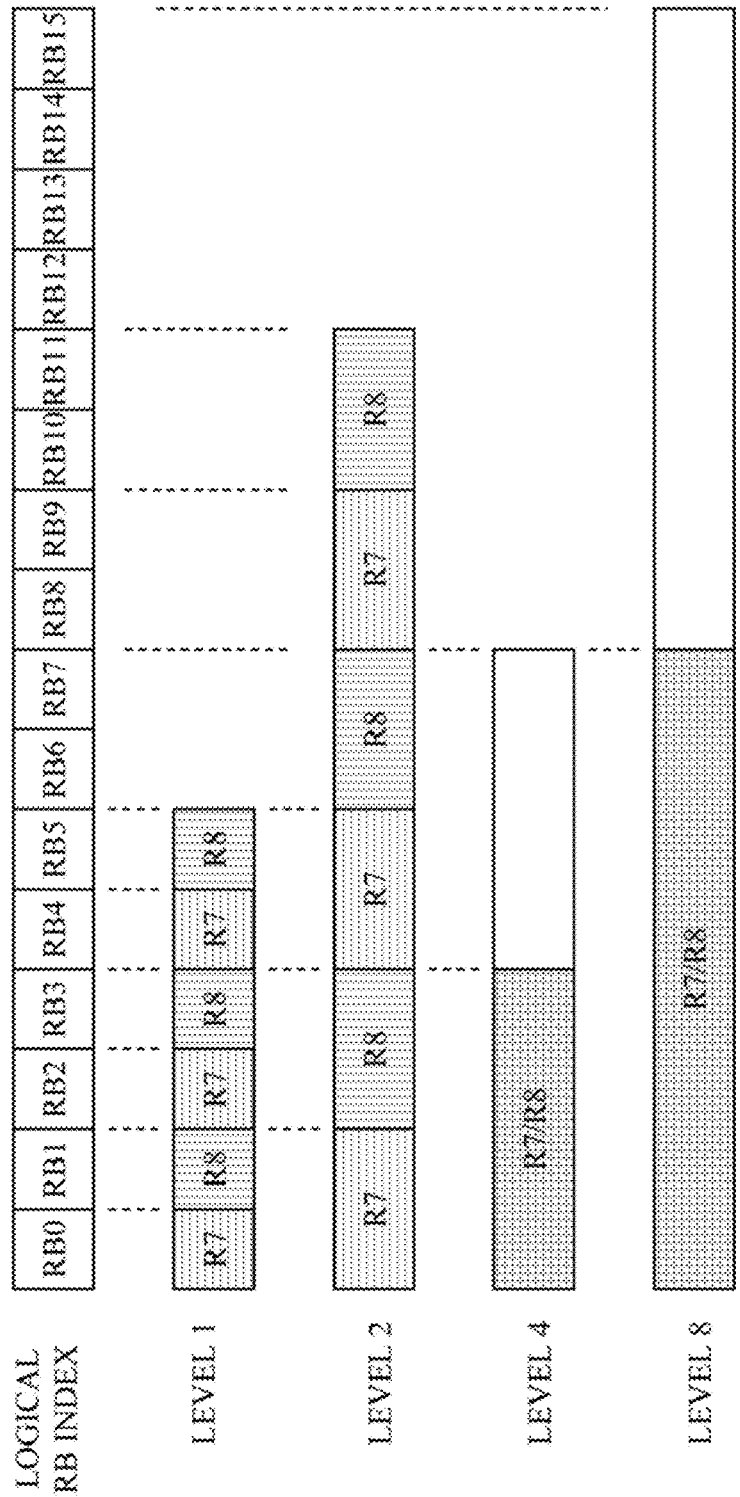
FIG. 11 is a block diagrams illustrating how a user equipment of the communication system of FIG. 3 may perform antenna port hashing in accordance with various embodiments of the present invention.

Referring now to FIGS. 10 and 11, block diagrams are provided that illustrate how a UE, such as UEs 301 and 302, may perform antenna port hashing in accordance with various embodiments of the present invention. In FIG. 10, the antenna port associated with each blind decoding candidate (or CCE) is determined based on a candidate index in the corresponding aggregation level. For example, the UE may use DMRS port 7 (R7) for all odd candidates and may use DMRS port 8 (R8) for all even candidates. That is, in aggregation level 1, the UE uses R7 for the odd candidates, that is, the first, third, and fifth RBs (indexed by logical RB indices RB0, RB2, and RB4), and uses R8 for the second, fourth, and sixth RBs (indexed by logical RB indices RB1, RB3, and RB5). Similarly, in aggregation level 2, the UE uses R7 for the first, third, and fifth candidates, that is, pairs of RBs (indexed by logical RB indices RB0/RB1, RB4/RB5, and RB8/RB9) and uses R8 for the second, fourth, and sixth candidates, that is, pairs of RBs (indexed by logical RB indices RB2/RB3, RB6/RB7, and RB10/RB11). In aggregation level 4, the UE uses R7 for the first candidate, that is, quadruplet of RBs (indexed by logical RB indices RB0-RB3) and uses R8 for the second candidate, that is, quadruplet of RBs (indexed by logical RB indices RB4-RB7). And in aggregation level 8, the UE uses R7 for the first candidate, that is, octuple of RBs (indexed by logical RB indices RB0-RB7) and uses R8 for the second candidate, that is, octuple of RBs (indexed by logical RB indices RB8-RB15). Thus, if the UE is expected to monitor two distinct DCI Format sizes (e.g. 0/1A with 40 bits payload with 1-bit in the payload to distinguish between 0 and 1A, and Format 2C with 70 bits payload), then the number of blind decoding attempts performed is given by 2×(6+6+2+2)=32. This is of the same order as 44, which is the number of blind decoding attempts in Rel-8. While not shown in FIG. 10, a second UE in the cell may be monitoring the control channels using complementary mapping—i.e. the UE may use DMRS port 7 (R7) for all even candidates and may use DMRS port 8 (R8) for all odd candidates.

And in FIG. 11, the antenna port associated with each blind decoding candidate (or CCE) is determined based on a candidate index in the corresponding aggregation level; however, as at some aggregation levels some RBs may not be searched, multiple DMRS ports may be searched for other RBs at that level. For example, and similar to FIG. 10, in aggregation level 1, the UE uses R7 for the odd candidates, that is, the first, third, and fifth RBs (indexed by logical RB indices RB0, RB2, and RB4), and uses R8 for the second, fourth, and sixth RBs (indexed by logical RB indices RB1, RB3, and RB5). In aggregation level 2, the UE uses R7 for the first, third, and fifth candidates, that is, pairs of RBs (indexed by logical RB indices RB0/RB1, RB4/RB5, and RB8/RB9) and uses R8 for the second, fourth, and sixth candidates, that is, pairs of RBs (indexed by logical RB indices RB2/RB3, RB6/RB7, and RB10/RB11). However, in aggregation level 3, RB4-RB7 are not used for EPDCCH. Accordingly, in aggregation level 4, the UE may use both R7 and RB for the candidate, that is, the quadruplet of RBs indexed by logical RB indices RB0-RB3. And in aggregation level 8, RB8-RB15 are not used for EPDCCH and, accordingly, the UE may use both R7 and R8 for the candidate, that is, the octuple of RBs indexed by logical RB indices RB0-RB7.

In still other embodiments of the present invention, the UE may imply a DMRS port from the DCI Format. For example, a UE may be expected to use DMRS port 7 to decode DCI Formats 0/1A and DMRS port 8 to decode DCI Formats 2/4, or DMRS port 7 for DL grants and DMRS port 8 for UL grants. The association of DCI format and DMRS port can be performed on a UE-specific basis, using hashing approaches further described herein. For example, a different hashing function may be used for each DCI format, which again may be a function of other parameters like an RB index, UEID, subframe index, and so on.

The EPDCCH can be sent in a set of PRB-pairs that is signaled to the UE by BS 310 via RRC. Adjacent PRBs (i.e. adjacent in frequency domain) may be bundled and the UE may assume same precoding applies to PRBs in a bundle which can provide improved channel estimation performance. The bundle size, for example, 1, 2, or 3 PRBs, can be signaled by the BS using RRC or can be the same as a Resource Block Group (RBG) size for a given DL system bandwidth. RRC signaling may be more flexible, but 3GPP LTE Release 10 PRB bundle sizes may be reused. Within each PRB bundle, all CCE combinations addressed to a UE may be decoded assuming the same DMRS transmission port. While the FIGS. 10 and 11 describe the hashing function based on the logical RB index, the same technique can applied to the case where the aggregation is defined as aggregation over PRB pairs instead of PRBs. In this case, the control channel candidate may occupy the first and second slot of the subframe (i.e. LVRB).

Referring now to FIG. 12, a block diagram is provided that depicts an exemplary static antenna virtualization of antenna port hashing in accordance with an embodiment of the present invention where antenna array 510 of BS 310 is used to steer spatially orthogonal beams, for example, a grid of beams (GoB), spanning a sector 1210 served by the BS. In the example shown, virtualization leads to pairs of antenna ports being associated with each sub-sector 1201-1204 of sector 1210, such as ports 7 and 8 associated with sub-sector 1201, ports 9 and 10 associated with sub-sector 1202, ports 11 and 12 associated with sub-sector 1203, and ports 13 and 14 associated with sub-sector 1204. This enables up to a rank 2 transmission for each UE in sector 1210 (leading to up to 8 aggregation layer transmission with MU-MIMO). With such a scheme, an EPDCCH codeword is transmitted on one or both of the pair of antenna ports based on a UE's, such as UEs 301 and 302, location, which location may be determined, for example, based on channel state feedback, such as Channel Quality Information (CQI) feedback or Channel State Information (CSI) feedback, Precoding Matrix (PMI) feedback, Rank Information, or UL channel sounding, such as UL Sounding Reference Signal (SRS) sounding, or both. Since the EPDCCH is transmitted only on a subset of the antenna ports, the UE can restrict blind decoding only to the relevant subset of antenna ports. In one such embodiment, BS 310 may transmit UE-specific antenna port subset information over RRC for the UE to monitor. In another such embodiment, the UE may determine the best 'N' ('N' equals 2 in FIG. 12) antenna ports that have the highest CSI, assuming single rank transmission over the two antenna ports. The UE then uses these 'N' antenna ports for restricted subset blind decoding. It is up to BS 310 to ensure that EPDCCH is transmitted over the best N antenna ports based on CSI feedback received from the UE.

By providing for a UE, when searching for different control channel candidates for blind decoding in a subframe, to determine antenna port for a control channel candidate as a function of a Resource Block (RB) or Control Channel Element (CCE) index of an RB or a CCE contained in the candidate, communication system 300 reduces the blind decoding complexity at the UE by reducing a size of a space in which the UE searches for control channel candidates. This reduces a time required to a UE to perform blind decoding of a control channel and also reduces the processing load on the UE when performing such blind decoding.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a user equipment of receiving control information from a wireless network, the method comprising:
   receiving a subframe comprising a plurality of time-frequency resources, the time-frequency resources comprising at least two control channel candidates;
   determining a first control channel candidate in the subframe;
   determining at least one first antenna port associated with the first control channel candidate;
   decoding the first control channel candidate of the at least two control channel candidates based on the determined at least one first antenna port;
   determining a second control channel candidate in the subframe; determining at least one second antenna port associated with the second control channel candidate;
   decoding the second control channel candidate of the at least two control channel candidates based on the determined at least one second antenna port;
   and receiving control information in one of the two control channel candidates;
   wherein the at least one first antenna port used for decoding the first control channel candidate is distinct from the at least one second antenna port used for decoding the second control channel candidate, and
   wherein the at least one first antenna port and the at least one second antenna port are respectively determined for the first control channel candidate and the second control channel candidate as a hash function of a Resource Block (RB), or Control Channel Element (CCE) index of an RB, or a CCE contained in the candidate.

2. The method of claim 1, wherein the plurality of time-frequency resources are arranged in resource blocks and a control channel candidate is associated with one or more of the resource blocks.

3. The method of claim 1, where the step of determining at least one antenna port associated with the first control channel candidate comprises the step of determining the antenna port based on a first resource block associated with the first control channel candidate.

4. The method of claim 1, wherein the first control channel candidate comprises a first control channel element within a first resource block.

5. The method of claim 4, wherein the second control channel candidate comprises a second control channel element within a second resource block.

6. The method of claim 1, wherein the determining at least one antenna port associated with the first control channel candidate comprises determining the at least one antenna port based at least on one of the following:
- a first resource block Index associated with the control channel candidate,
- an associated downlink control information (DCI) format hypothesis, a System Frame Number, a Slot Number, a Cell Identifier, a Point Identifier,
- a control antenna port identifier sent via a legacy control channel,
- a control port hopping pattern,
- restricted ports signaled via higher layer signaling, and
- a channel state information reference signal (CSI-RS) configuration.

7. The method of claim 1, wherein decoding the first control channel candidate comprises:
- obtaining a channel estimate associated with the reception of the first control channel candidate based on a first reference signal associated with the at least one first antenna port; and
- decoding the received signal based on the control channel candidate and the obtained channel estimate to detect downlink control information.

8. The method of claim 1, wherein decoding the second control channel candidate comprises:
- obtaining a channel estimate associated with the reception of the second channel candidate based on a reference signal associated with the at least one second antenna port; and
- decoding the received signal based on the control channel candidate and the obtained channel estimate to detect downlink control information.

9. The method of claim 1, wherein at least one of the first antenna port and the second antenna port is determined based on a signal received from the wireless network.

10. The method of claim 1, further comprising:
- estimating channel state information (CSI) associated with a set of antenna ports that includes the first antenna port and the and the second antenna port and
- selecting the first antenna port and the second antenna port based on the estimated CSI.

11. A user equipment capable of receiving control information from a wireless network, the user equipment comprising;
- a wireless transceiver; and
- a signal processing unit coupled to the transceiver and that is configured to receive a subframe comprising a plurality of time-frequency resources, the time-frequency resources comprising at least two control channel candidates, determine a first control channel candidate of the at least two control channel candidates in the subframe, determined at least one first antenna port associated with the first control channel candidate, decode the first control channel candidate based on the determined at least one first antenna port, determine a second control channel candidate of the at least two control channel candidates in the subframe, determine at least one second antenna port associated with the second control channel candidate, decode the second control channel candidate based on the determined at least one second antenna port, and receive control information in one of the two control channel candidates, wherein at least one antenna port used for decoding the first control channel candidate is distinct from one antenna port used for decoding the second control channel candidate, and wherein the at least one first antenna port and the at least one second antenna port are respectively determined for the first control channel candidate and the second control channel candidate as a hash function of a Resource Block (RB), or Control Channel Element (CCE) index of an RB, or a CCE contained in the candidate.

12. The user equipment of claim 11, wherein the plurality of time-frequency resources are arranged in resource blocks and a control channel candidates is associated with one or more of the resource blocks.

13. The user equipment of claim 11, wherein the step of determining at least on antenna port associated with the first control channel candidate comprises the step of determining the antenna port based on a first resource block associated with the first control channel candidate.

14. The user equipment of claim 11, wherein the first control channel candidate comprises a first control channel element within a first resource block.

15. The user equipment of claim 14, wherein the second control channel candidate comprises a second control channel element within a second resource block.

16. The user equipment of claim 11, wherein the signal processing unit is configured to determine at least one antenna port associated with the first control channel candidate by determining the at least one antenna port based at least one of the following:
- a first resource block Index associated with the control channel candidate,
- an associated downlink control information (DCI) format hypothesis, a System Frame Number, a Slot Number, a Cell Identifier, a Point Identifier,
- a control antenna port identifier sent via legacy control channel,
- a control port hopping pattern,
- restricted ports signaled via higher layer signaling, and
- a channel state information reference signal (CSI-RS) configuration.

17. The user equipment of claim 11, wherein the signal processing unit is configured to decode the first control channel by obtaining a channel estimate associated with the reception of the first control channel candidate based on a first reference signal associated with the at least one first antenna port and decoding the received signal based on the control channel candidate and the obtained channel estimate to detect downlink control information.

18. The user equipment of claim 11, wherein the signal processing unit is configured to decode the second control channel candidate by obtaining a channel estimate associated with the reception of the second channel candidate based on a reference signal associated with the at least one second antenna port and decoding the received signal based on the control candidate and the obtained channel estimate to detect downlink control information.

19. The user equipment of claim 11, wherein at least one of the first antenna port and the second antenna port is determined based on a signal received from the wireless network.

20. The user equipment of claim 11, wherein the signal processing unit is configured to estimate channel state information (CSI) associated with a set of antenna ports that includes the first antenna port and the second antenna port and select the first antenna port and the second antenna port based on the estimated CSI.

* * * * *